(12) United States Patent
Xu et al.

(10) Patent No.: US 9,756,644 B2
(45) Date of Patent: Sep. 5, 2017

(54) APPARATUS AND METHOD FOR AN ADAPTIVE PERIODIC BANDWIDTH ALLOCATION APPROACH IN A SHARED BANDWIDTH COMMUNICATIONS SYSTEM

(71) Applicant: Hughes Network Systems, LLC, Germantown, MD (US)

(72) Inventors: Jun Xu, Clarksburg, MD (US); Robert Torres, New Market, MD (US); John Border, Adamstown, MD (US); Szuyuan Huang, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/680,055

(22) Filed: Apr. 6, 2015

(65) Prior Publication Data

US 2015/0289279 A1 Oct. 8, 2015

Related U.S. Application Data

(60) Provisional application No. 61/975,907, filed on Apr. 6, 2014.

(51) Int. Cl.
*H04W 72/04* (2009.01)
*H04W 72/08* (2009.01)
(Continued)

(52) U.S. Cl.
CPC ... *H04W 72/0486* (2013.01); *H04W 72/0413* (2013.01); *H04W 72/04* (2013.01);
(Continued)

(58) Field of Classification Search
CPC ................................. H04W 72/0486
See application file for complete search history.

(56) References Cited

U.S. PATENT DOCUMENTS

| 5,923,648 | A | * | 7/1999 | Dutta | ................ H04B 7/18513 370/280 |
| 5,982,761 | A | * | 11/1999 | Dutta | .................... H04B 7/212 370/337 |

(Continued)

OTHER PUBLICATIONS

PCT/US2015/024590 ISR & WO, Jul. 13, 2015.

*Primary Examiner* — Andrew Lai
*Assistant Examiner* — Andrew C Lee
(74) *Attorney, Agent, or Firm* — Potomac Technology Law, LLC

(57) ABSTRACT

An approach is provided for bandwidth allocation on a per terminal utilization and per inroute/inroute group basis, which optimizes bandwidth utilization. An aggregate average bandwidth usage of a plurality of remote terminals over a wireless communications channel is determined. A maximum rate for bandwidth allocations to each of the remote terminals for respective data transmissions over the channel is determined. A utilization metric reflecting a bandwidth utilization by one of the remote terminals for data transmissions over the channel is determined. An updated rate for bandwidth allocations to the one terminal is determined based on the utilization metric for the terminal, a target bandwidth utilization and tolerance range for the one terminal, and the maximum rate for the data allocations to each of the remote terminals. The updated rate for the bandwidth allocations to the one terminal is applied to subsequent bandwidth allocations for the one terminal.

16 Claims, 6 Drawing Sheets

(51) Int. Cl.
  *H04W 72/10*  (2009.01)
  *H04W 74/08*  (2009.01)

(52) U.S. Cl.
  CPC ...... *H04W 72/0446* (2013.01); *H04W 72/087* (2013.01); *H04W 72/10* (2013.01); *H04W 74/0833* (2013.01)

(56) References Cited

U.S. PATENT DOCUMENTS

| | | | |
|---|---|---|---|
| 6,005,855 A * | 12/1999 | Zehavi | H04B 7/18513 370/335 |
| 6,404,738 B1 | 6/2002 | Reininger et al. | |
| 6,738,363 B1 * | 5/2004 | Best | H04W 72/10 370/322 |
| 6,982,969 B1 * | 1/2006 | Carneal | H04W 84/08 370/329 |
| 7,039,706 B1 | 5/2006 | Parker et al. | |
| 7,215,652 B1 * | 5/2007 | Foley | H04B 7/212 370/316 |
| 7,359,344 B1 * | 4/2008 | Cheng | H04B 7/18589 370/321 |
| 9,276,665 B1 * | 3/2016 | Johnson | H04B 7/2041 |
| 2001/0025377 A1 * | 9/2001 | Hinderks | H04L 12/1859 725/109 |
| 2002/0046264 A1 | 4/2002 | Dillon et al. | |
| 2002/0131375 A1 * | 9/2002 | Vogel | H04B 7/18584 370/322 |
| 2003/0050008 A1 * | 3/2003 | Patterson | H04B 7/18578 455/12.1 |
| 2003/0081582 A1 * | 5/2003 | Jain | H04B 7/18582 370/338 |
| 2004/0163024 A1 * | 8/2004 | Kawai | H04B 7/18523 714/748 |
| 2004/0229572 A1 * | 11/2004 | Cai | H04W 52/12 455/69 |
| 2007/0087690 A1 * | 4/2007 | Karabinis | H04B 7/18515 455/12.1 |
| 2007/0192805 A1 * | 8/2007 | Dutta | H04B 7/18563 725/64 |
| 2007/0217355 A1 * | 9/2007 | de La Chapelle | H04L 1/0002 370/328 |
| 2009/0238207 A1 | 9/2009 | Zhao et al. | |
| 2011/0021137 A1 * | 1/2011 | Laufer | H04B 7/212 455/13.4 |
| 2013/0136000 A1 | 5/2013 | Torres et al. | |

* cited by examiner

APPARATUS AND METHOD FOR AN ADAPTIVE PERIODIC BANDWIDTH ALLOCATION APPROACH IN A SHARED BANDWIDTH COMMUNICATIONS SYSTEM

RELATED APPLICATIONS

This application claims the benefit of the earlier filing date under 35 U.S.C. §119(e) of U.S. Provisional Application Ser. No. 61/975,907 (filed 2014 Apr. 6).

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems. For example, in a network with multiple remote nodes (e.g., remote terminals) using shared bandwidth to attempt to send data into the network, quality of service (QoS) is required on every link of the network in each direction. Further, an appropriate bandwidth allocation mechanism is required to achieve the QoS requirements for interactive traffic and to optimize channel utilization (e.g., to increase bandwidth availability, while decreasing bandwidth waste). In the satellite network, for example, supporting delay sensitive data traffic over the return or inroute link (the link from the remote terminal back to the gateway) presents significant challenges with regard to network resource management. Such challenges are due to various factors, including difficulty in balancing latency performance and channel efficiency (e.g., efficient bandwidth utilization). Delay or latency sensitive traffic of varying input rates (e.g., regular or secured web browsing—such as hypertext transfer protocol (HTTP) and secure HTTP (HTTPS)) is typically classified as an interactive class, which can be transmitted using periodic and high priority backlog-based bandwidth allocations. Data traffic through terrestrial backhaul is also latency sensitive and demanding on bandwidth.

Further, certain conditions may be present in such a system, such as: (1) the incidence of interactive applications that are more latency sensitive (e.g., voice over Internet Protocol (VoIP) and web-browsing, which reflect a class of applications that require bursts of small bandwidth allocations when actively transmitting data; (2) the interactive applications generally require minimum or no delay in transmitting data, thus requiring bandwidth to be effectively available instantaneously; (3) the inability for interactive applications to rely on bandwidth allocated in response to explicit bandwidth requests as packets arrive for transmission; (4) the difficulty in identifying bandwidth demands of interactive applications in advance, because of the inherent randomness of the user operations in such interactive applications; and (5) the inability to provide continuous dedicated bandwidth allocation to remote nodes.

In the presence of such conditions, it becomes a challenge to satisfy bandwidth requirements criteria for latency sensitive applications. For example, such criteria may include utilization of request-based bandwidth allocation algorithms or approaches to allocate bandwidth, while meeting the delay requirements for interactive traffic, the provision of continuous dedicated bandwidth at some predefined rate that satisfies such delay requirements (e.g., such would be inefficient in terms of channel utilization), and addressing dynamic changes in application bandwidth demands, and continuing to make bandwidth allocations in a manner that minimizes transmission delay and increases channel utilization. Moreover, such criteria become even more demanding in a shared bandwidth access network with long round trip propagation delay (e.g., a satellite network). For example, in a satellite network, supporting delay sensitive data traffic in the return-link (inroute) direction presents enhanced challenges in network resource management, based, as one example, on enhanced difficulties in balancing latency performance and channel utilization (e.g., a difficult balance presents itself when trying to allocate bandwidth that predicts the arrival of delay sensitive traffic, without significant underutilization of network resources).

Current bandwidth on demand (BOD) systems or algorithms either allocate bandwidth on an as needed basis in attempts to achieve optimal channel or bandwidth utilization efficiency, but thereby sacrifice efficiency in satisfying the requirements of latency sensitive applications, or allocate a pre-determined rate of bandwidth in attempts to achieve efficiency in satisfying the requirements of latency sensitive applications, but thereby sacrifice optimal channel or bandwidth utilization efficiency. Other current methods apply a hybrid approach of these foregoing two methods, but fail to achieve an efficient and satisfactory predictive balance (e.g., with a simple algorithm for providing additional predictive bandwidth to improve latency, while releasing unneeded bandwidth to improve channel efficiency and bandwidth utilization). Further, some current methods may apply a predictive periodic bandwidth approach, but fail to address all of the bandwidth requirements criteria for latency sensitive applications (e.g., fail to optimize latency and bandwidth utilization on both the individual link of a terminal as well as system-wide). For example, in order to serve latency sensitive traffic at the return channel (inroute) in current systems, in anticipation of the arrival of delay sensitive traffic to active terminals, a gateway (GW) assigns a constant periodic bandwidth to such terminals above their respective demands. While this may serve to reduce traffic latency, however, it wastes bandwidth (e.g., when a terminal is currently receiving an active periodic bandwidth, but does not have a respective level of data (or any data) to send. Further, such an approach may also limit near term throughput when a terminal exhibits a sudden burst of delay sensitive traffic that exceeds the constant periodic assignment.

One example of the application of a periodic bandwidth allocation is with respect to HTTPS applications. HTTPS traffic requires a certain amount of periodic bandwidth to maintain reasonable latency. For example, in some instances HTTPS traffic may require a periodic bandwidth of 20 kbps to 32 kbps, assisted by backlog-based bandwidth allocations, to provide reasonably satisfactory latency performance. More specifically, on an inroute with QPSK rate 4/5 modulation, 9 slots of periodic bandwidth allocation every 2 frames would provide approximately 19.2 kbps, and 15 slots every 2 frames would provide approximately 32 kbps. Accordingly, ideally, a particular applications HTTPS traffic requirements should be able to be satisfied by providing such a constant periodic rate. In reality, however, it is difficult to identify the particular applications/terminals running HTTPS, as the data packets are multiplexed at the link layer. Typically, therefore, current approaches allocate periodic bandwidth to all active terminals so as not to degrade the performance of those terminals running secured HTTP transactions. The periodic bandwidth is then released when the network observes no activity from the terminal for a preconfigured amount of time. As the number of subscribers grows, however, the number of active terminals, which would force a reduction of the periodic bandwidth allocations to the active terminals, and thus results in a degradation of HTTPS performance in those terminals actually running HTTPS applications. For example, if the periodic bandwidth allocation is reduced to 6 slots every 4 frames or 3 slots every 2 frames (at QPSK rate 4/5) only a 6.4 kbps rate is provided, which would be unsatisfactory for the terminals running HTTPS applications. Also, for the terminals not running HTTPS applications, not all the allocated periodic bandwidth is utilized, which results in a low inefficient utilization of the inroute bandwidth. Other applications of periodic bandwidth allocation include web browsing, interactive gaming, interactive streaming, and adaptive constant bit rate (CBR) services.

What is needed, therefore, is a system and method to address the challenges providing an appropriate bandwidth allocation mechanism in a shared bandwidth network environment, which satisfies QoS requirements for interactive traffic, while optimizing channel/bandwidth utilization.

SOME EXAMPLE EMBODIMENTS

The present invention advantageously addresses the foregoing requirements and needs, as well as others, by providing a bandwidth allocation approach (e.g., for a shared bandwidth network environment, such as a shared bandwidth satellite system) based on both per terminal utilization and per inroute or inroute group considerations, which satisfies QoS requirements for interactive traffic, while optimizing channel/bandwidth utilization.

In accordance with example embodiments of the present invention, a method is provided for a bandwidth allocation approaches. An aggregate average bandwidth usage of a plurality of remote terminals over a channel of a wireless data communications system is determined. A maximum rate for bandwidth allocations to each of the remote terminals for respective data transmissions over the channel is determined. A utilization metric reflecting a bandwidth utilization by a one of the remote terminals for its data transmissions over the channel is determined. An updated rate for bandwidth allocations to the one remote terminal is determined based on the determined utilization metric for the terminal, a target bandwidth utilization and respective tolerance range for the terminal, and the determined maximum rate for the data allocations to each of the remote terminals. The updated rate for the bandwidth allocations is applied to the one remote terminal to one or more subsequent bandwidth allocations for the one remote terminal.

In accordance with further example embodiments of the method, the method operates within a one of two rate ranges for the bandwidth allocations to each of the remote terminals for respective data transmissions over the channel, and wherein a first Range A of the rate ranges serves as a lower range and a second Range B of the rate ranges serves as an upper range. Where the method is operating within the Range A, (1) the determination of the updated rate for the bandwidth allocations to the one remote terminal comprises determining an updated allocation rate index based on the determined utilization metric for the terminal, the target bandwidth utilization and respective tolerance range for the terminal, and the determined maximum rate for the data allocations to each of the remote terminals, and (2) the application of the updated rate to the one or more subsequent bandwidth allocations for the one remote terminal comprises obtaining the updated rate from a predetermined rate table based on the updated allocation rate index. Where the method is operating with in the Range B, (1) the determination of the updated rate for the bandwidth allocations to the one remote terminal comprises determining a relative rate step change based on the determined utilization metric for the terminal, the target bandwidth utilization and respective tolerance range for the terminal, and the determined maximum rate for the data allocations to each of the remote terminals, and (2) the application of the updated rate to the one or more subsequent bandwidth allocations for the one remote terminal comprises applying the rate step change to a current rate for the bandwidth allocations to the one remote terminal.

In accordance with further example embodiments of the method, it is determined whether a transition point has been reached for a transition between the Range A and the Range B. When it is determined that the transition point has not been reached, the determination (1) of the updated rate for the bandwidth allocations to the one remote terminal, and the application (2) of the updated rate to the one or more subsequent bandwidth allocations for the one remote terminal are performed as specified in claim 2 based on the range within which the method is operating. When it is determined that the transition point has been reached: (a) where the method is operating within the Range A, the method operation is switched from the Range A to the Range B, and the determination (1) of the updated rate for the bandwidth allocations to the one remote terminal, and the application (2) of the updated rate to the one or more subsequent bandwidth allocations for the one remote terminal are performed as specified in claim 2 based on the operation within the Range B; and (b) where the method is operating within the Range B, the method operation is switched from the Range B to the Range A, and the determination (1) of the updated rate for the bandwidth allocations to the one remote terminal, and the application (2) of the updated rate to the one or more subsequent bandwidth allocations for the one remote terminal are performed as specified in claim 2 based on the operation within the Range A.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
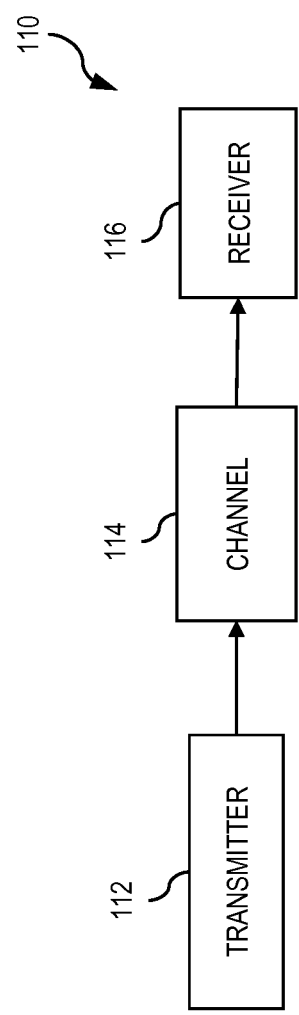
FIGS. 1A, 1B and 1C illustrate communications systems capable of employing approaches, in accordance with example embodiments of the present invention.

A bandwidth allocation approach (e.g., for a shared bandwidth network environment, such as a shared bandwidth satellite system), based on both per terminal utilization and per inroute or inroute group considerations, which satisfies QoS requirements for interactive traffic, while optimizing channel/bandwidth utilization, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Figure 1B:
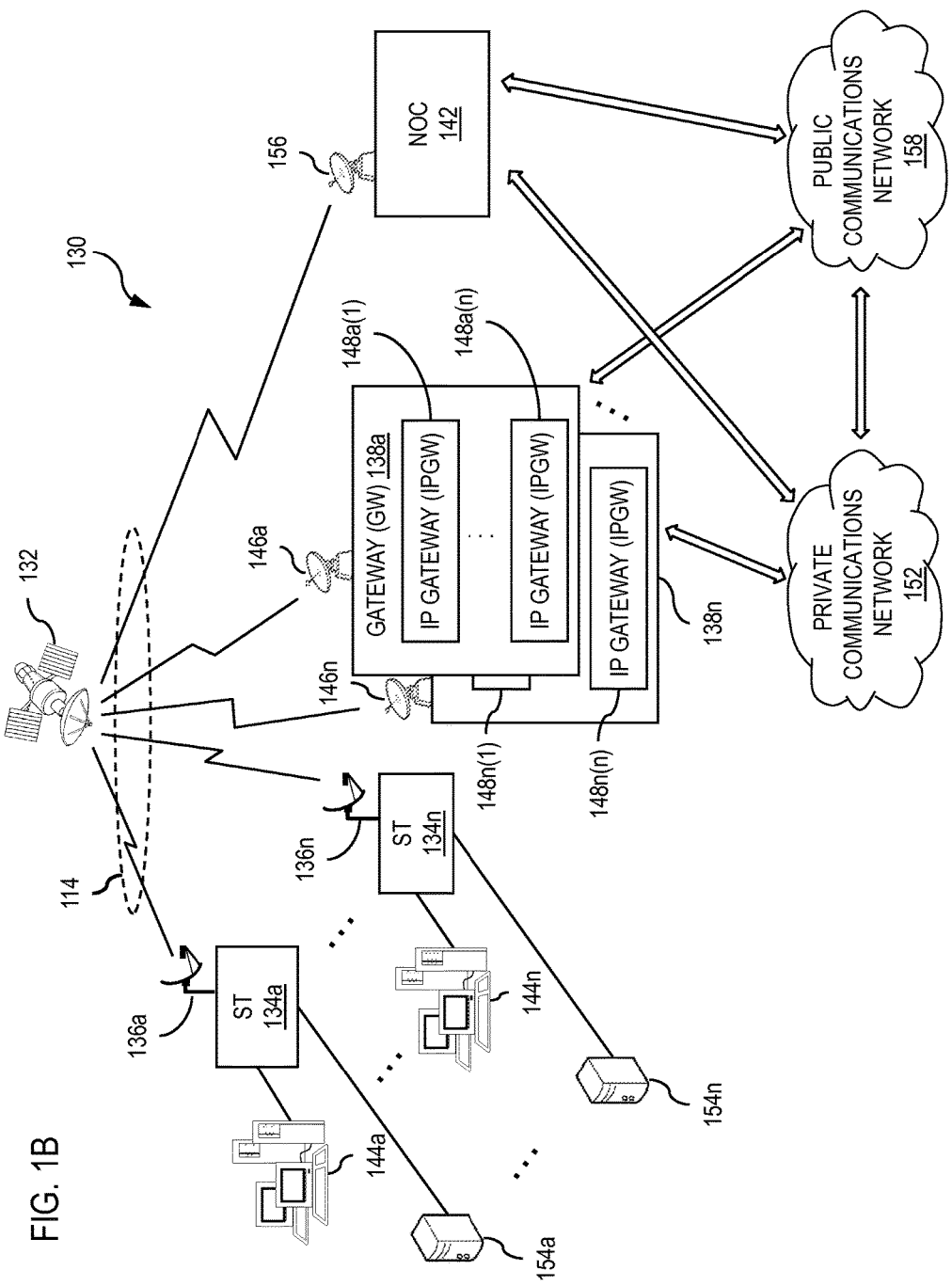
Figure 1C:
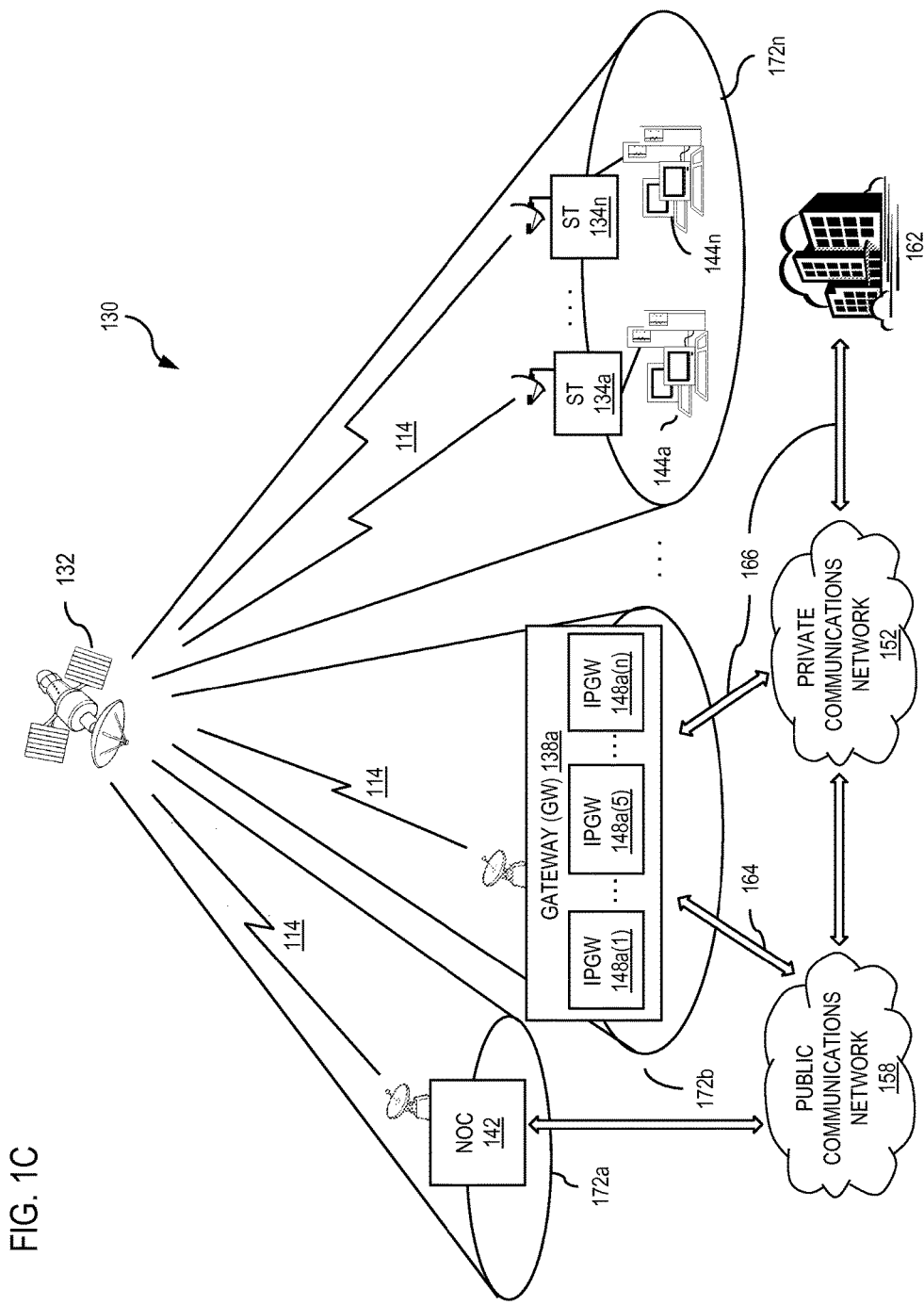

FIGS. 1A-1C illustrate communications systems capable of employing a bandwidth allocation approach (e.g., for a shared bandwidth network environment, such as a shared bandwidth satellite system) that satisfies QoS requirements for interactive traffic, while optimizing channel/bandwidth utilization, according to various example embodiments. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

FIG. 1B illustrates an example satellite communications system 130 capable of supporting communications among terminals with varied capabilities, according to example embodiments. Satellite communications system 130 includes a satellite 132 that supports communications among multiple satellite terminals (STs) 134$a$-134$n$, a number of gateways (GWs) 138$a$-138$n$, and a network operations center (NOC) 142. The STs, GWs and NOC transmit and receive signals via the antennas 136$a$-136$n$, 146$a$-146$n$, and 156, respectively. According to different embodiments, the NOC 142 may reside at a separate site reachable via a separate satellite channel or may reside within a GW site. The NOC 142 performs the management plane functions of the system 130, while the GWs 138$a$-138$n$ perform the data plane functions of the system 130. For example, the NOC 142 performs such functions as network management and configuration, software downloads (e.g., to the STs 134$a$-134$n$), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138$a$-138$n$ include one or more IP gateways (IPGWs)—whereby the data plane functions are divided between a GW and its respective IPGWs. For example, GW 138$a$ includes IPGWs 148$a$(1)-148$a$(n) and GW 138$n$ includes IPGWs 148$n$(1)-148$n$(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Accordingly, an inroute manager or inroute group manager (IGM) (not shown) may be located at each of the gateways. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 142, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an example embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(5)—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(5)). The IPGW 148a(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a-134n)—where STs 134a-134n are correspondingly associated with the two IPGWs 148a(1) and 148a(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(5). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite of such a system acts as a bent pipe or repeater, transmitting communications between the STs 134a-134n and their respective associated IPGWs 148a-148n.

According to example embodiments, an approach for adaptively allocating return channel (inroute) bandwidth to remote terminals based on their respective utilization levels is provided. By way of example, the Inroute Group Manager (IGM) may adaptively adjust the allocated bandwidth to a terminal based on its bandwidth utilization. By way of further example, setting a utilization target for each terminal, the IGM monitors the calculated bandwidth utilization, assigning more slots when the utilization is high and fewer slots when the utilization is low. In this manner, both channel efficiency and the latency performance is significantly improved. While, in practice, it may be sufficient to provide satisfactory latency performance for HTTPS using relatively low periodic inroute throughput rate allocations, other interactive applications would require higher inroute rate. Embodiments of the present invention, therefore, provide for approaches that support both low and high periodic inroute rate adaptations. By way of example, an appropriate indexed bandwidth allocation set is be pre-defined, such as via a periodic bandwidth allocation table (PBA table), covering very light traffic and sufficiently satisfactory latency performance of HTTPS at the inroute. Additionally, a relative step based rate control mechanism is provided to meet the need of higher inroute bandwidth rate requirements. Further, a rate adaptation method can be included to improve the HTTPS and interactive latency and bandwidth utilization (channel efficiency), while also maintaining the overall usage of the periodic allocation at the system level.

Such approaches thereby overcome the foregoing drawbacks by adaptively adjusting the amount of bandwidth allocated periodically to a terminal based on its utilization. For example, more bandwidth is assigned to some terminals over others basing predictions of future needs on respective prior bandwidth utilization observations. Additionally, bandwidth resource utilization is optimized, for example, by dynamically limiting the overall bandwidth available for such adaptive periodic allocations, ensuring bandwidth availability for other applications, such as delay insensitive applications. Accordingly, example embodiments of the present invention provide significant improvements in bandwidth allocation approaches or algorithms by providing remote terminals with bandwidth beyond their current demand, as a dynamic function of (a) the respective utilization by a terminal of this predictive bandwidth, and (b) the overall state of the available bandwidth resources in the network. Moreover, example embodiments optimize system performance in terms of latency and channel/bandwidth utilization efficiency, as well as implementing fairness among terminals with heterogeneous traffic classes.

In accordance with example embodiments of the present invention, an approach for periodic rate adaptation for bandwidth allocation comprises an inner traffic control loop and an outer traffic control loop. Pursuant to the inner loop, bandwidth is assigned to a remote terminal based on usage/utilization. Accordingly, the inner loop addresses bandwidth allocation/utilization on a per terminal basis. Pursuant to the outer loop, the overall bandwidth for periodic respective allocations is controlled for all active terminals of (e.g., all active terminals of a one inroute group). Accordingly, the outer loop addresses bandwidth allocation/utilization in the aggregate of all terminals. Additionally, the outer loop may be applied at either a per inroute basis or a per Inroute Group level basis.

I. Inner Loop Rate Control

Figure 2:
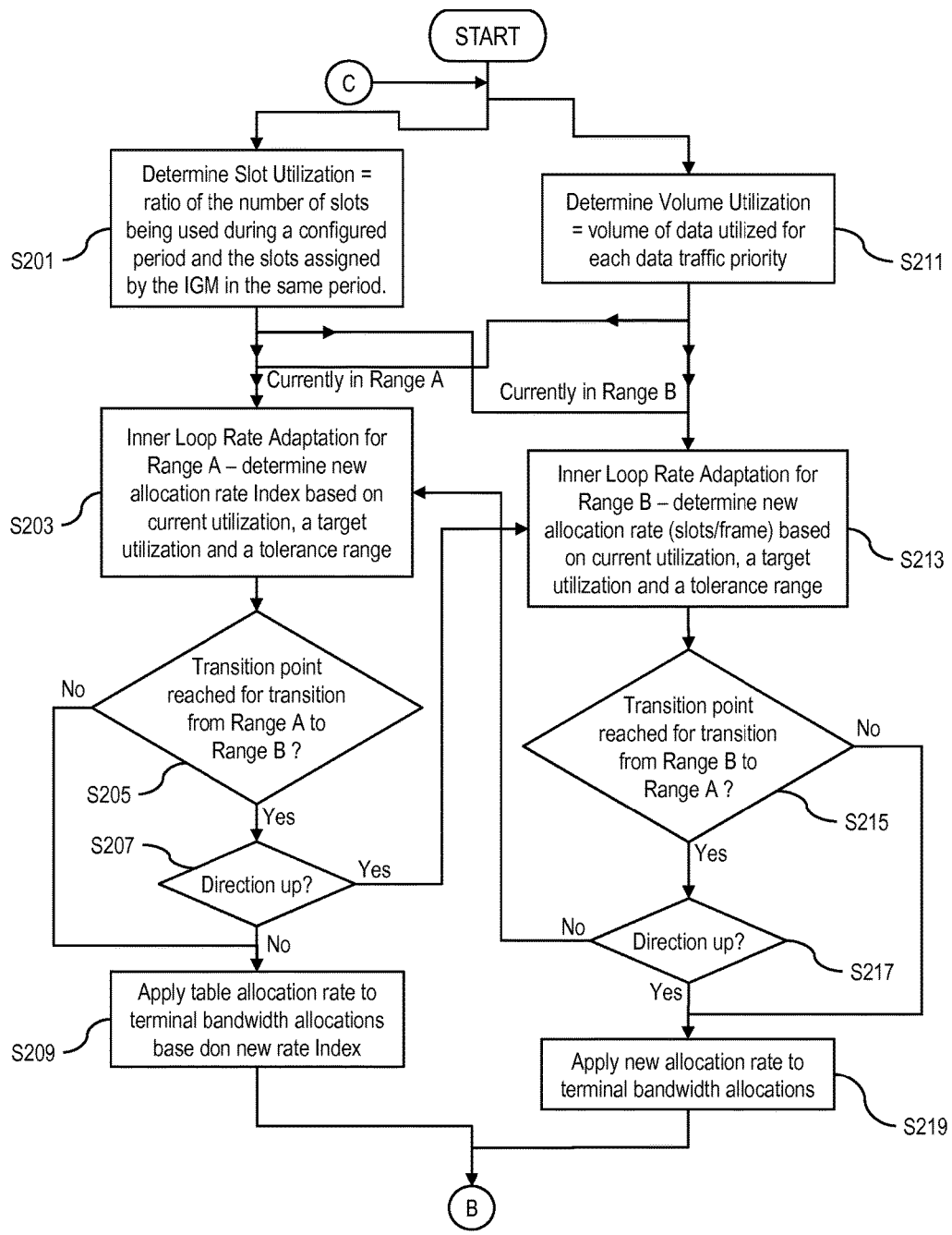
FIG. 2 illustrates a flow chart depicting an Inner Loop algorithm for periodic adaptation of rates for bandwidth allocations (on a per terminal basis), in accordance with example embodiments of the present invention.

FIG. 2 illustrates a flow chart depicting an Inner Loop algorithm for periodic adaptation of rates for bandwidth allocations (on a per terminal basis), in accordance with example embodiments of the present invention. In accordance with such example embodiments, pursuant to the inner loop, the IGM monitors the slot utilization of a given terminal by determining an average slot or volume utilization of that terminal over a certain time period. Then, based on a comparison of the determined average utilization against a pre-defined target utilization, the IGM adaptively adjusts the bandwidth allocated to the terminal based on actual terminal usage. In other words, if the bandwidth utilization of a terminal is below a target percentage or threshold then the bandwidth allocated to the terminal can be decreased, and if the bandwidth utilization of a terminal is above a target percentage or threshold than the bandwidth allocated to that terminal can be increased. In that regard, extra bandwidth that will not be utilized by a terminal will not be allocated to that terminal, and the terminal will not be choked to the point that the quality service achievable by the terminal is below a desired level. By way of example, the utilization determination may be performed on a periodic basis in order to dynamically adapt bandwidth allocation and bandwidth utilization based on the changing needs of each terminal. Accordingly, pursuant to the inner loop, bandwidth utilization is maximized on a per terminal basis. By way of further example, the bandwidth allocation to a particular terminal, as necessary, may be increased or decreased on a step-by-step basis so as not to unnecessarily increase bandwidth allocation to a terminal beyond a point whereby the terminal will achieve the target utilization, or so as not to unnecessarily decreased bandwidth allocation to a terminal beyond a point where the quality of service achievable by the terminal is below a desired level.

According to one example embodiment, the inner loop rate control considers adaptive bandwidth allocation for an individual terminal based on two stages. A first stage for a low rate range, in the format of M slots every N frames (hereinafter referred to as "Range A"), and a second stage for a high rate range, in the format of M slots per every frame (hereinafter referred to as "Range B"). By way of example, when a relatively high number of remote terminals are active or in-service, the network could operate in Range A (lowering bandwidth per terminal to ensure there is enough capacity to address the needs of each terminal), whereas, when the number of active terminals is relatively lower, the network may run in Range B, (a higher allocation may be available for each terminal, because there are fewer terminals to service).

A. Ranges A and B

In accordance with this embodiment, a Periodic Bandwidth Allocation table is first defined or predetermined for the Range A. By way of example, Table 1 reflects such a predetermined Periodic Bandwidth Allocation Table. According to the table, the rate scope for the Range A table is separated into a series of rate steps throughout the range, and each rate step is assigned a respective bandwidth allocation index (shown in the first, the table). Each rate index is associated with a rate specified as a number of slots assigned to a terminal over a respective number of frames within a given period, where the period reflects the time span between adjustment of the assigned rate for a terminal. The index is merely used to represent and associated predefined allocation rate for the respective terminal, where the allocation rate is in the format of M slots every N frames, denoted as "M/N". The next four columns the table reflect examples of information bit rates achieved based on the respective allocation rate and applied modulation and coding ("modcod") scheme, which are provided as examples for demonstration purposes only. By way of example, when configured in the system, the predetermined rates in the table would take into account the applicable modcod schemes in order that the rates would accommodate the actual information rate of the respective terminal. Further, both the number of rate index and the value of "M/N" of each entry are provided as examples, and, in practice, are subject to a desired configuration.

TABLE 1

Inroute Periodic Bandwidth Allocation Table (Range A)

| BW Allocation Index | Number of slots assigned | Number of frames per period | Information bit rate (R9/10) (kbps) | Information bit rate (R4/5) (kbps) | Information bit rate (R2/3) (kbps) | Information bit rate (R1/2) (kbps) |
| --- | --- | --- | --- | --- | --- | --- |
| 1 | 4 | 8 | 1.8 | 1.6 | 1.33 | 1 |
| 2 | 4 | 4 | 3.6 | 3.2 | 2.67 | 2 |

TABLE 1-continued

Inroute Periodic Bandwidth Allocation Table (Range A)

| BW Allocation Index | Number of slots assigned | Number of frames per period | Information bit rate (R9/10) (kbps) | Information bit rate (R4/5) (kbps) | Information bit rate (R2/3) (kbps) | Information bit rate (R1/2) (kbps) |
|---|---|---|---|---|---|---|
| 3 | 6 | 4 | 7.2 | 6.4 | 5.33 | 4 |
| 4 | 9 | 4 | 10.8 | 9.6 | 8 | 6 |
| 5 | 6 | 2 | 14.4 | 12.8 | 10.67 | 8 |
| 6 | 15 | 4 | 18 | 16 | 13.33 | 10 |
| 7 | 9 | 2 | 21.6 | 19.2 | 16 | 12 |
| 8 | 21 | 4 | 25.2 | 22.4 | 18.67 | 14 |
| 9 | 12 | 2 | 28.8 | 25.6 | 21.33 | 16 |
| 10 | 27 | 4 | 32.4 | 28.8 | 24 | 18 |
| 11 | 15 | 2 | 36 | 32 | 26.67 | 20 |
| 12 | 8 | 1 | 38.4 | 34.13 | 28.44 | 21.33 |

According to further embodiments, in instances where a terminal requires a more constant slot or rate allocation (e.g., for time sensitive information or applications requiring a constant bit rate such as voice over IP), an amount of system bandwidth may be reserved for such high priority or constant bit rate requirements.

Further, with reference to Table 1, the largest index is 12, corresponding to 8 slots every single frame. Accordingly, above this rate, an integer number of slots in one single frame can be assigned rather than multiple frames without overlapping the Range A. Pursuant to this embodiment, therefore, Range B may be defined as the rates above the maximum index in Range A, whereby a predetermined relative step size would be set for further adjustment of rates beyond those of Range A. In other words, the relative step size (e.g., 5%) would be applied for incrementally adjusting the bandwidth allocation rate (on a per terminal basis), for each update period. An adjustment of the rate would thereby be performed by increasing or decreasing the current rate by the relative step size, which would result in a new rate in the format of an integer number of slots per frame.

B. Terminal Bandwidth Utilization

In accordance with this embodiment, two approaches are provided for determining the respective bandwidth utilization of a terminal. A first approach bases the utilization determination on the terminal usage of periodically allocated slots in each frame (Slot Utilization), whereas a second approach bases the utilization determination on the terminal volume (e.g., in bytes) usage (Volume Utilization). Slot utilization targets periodic usage. As bandwidth allocations and burst size increase, however, the slot utilization approach decreases in accuracy as all the allocated slots are counted even though not all are used for high priority delay sensitive traffic. In such cases, volume utilization provides more accurate usage estimation.

(1) Slot Utilization

Pursuant to the slot utilization approach, the slot utilization is defined as a ratio of the number of slots used by a terminal during a configured period (e.g., measured in frames) and the number of slots assigned to the terminal during that period. For example, the IGM may determine the utilization of the assigned slots by examining the slot usage of the respective burst transmitted by the terminal. As long as an assigned burst carries data (of any traffic type), the corresponding slots within this burst are all considered as used. The configured period is referred to as Averaging Period. The averaging period, for example, should cover at least one round trip time (RTT) of satellite propagation (e.g., which, for a geosynchronous system, may be approximately 600 to 700 ms), and should be set at a maximum such that the IGM can dynamically adjust the allocation rate to accommodate for changes in terminal utilization. For example, a typical default value for the average period may be 40 frames.

By way of example, where t denotes time (e.g., specified as a frame point) and $T_{Avg}$ denotes the averaging period (e.g., specified as a number of frames), the average slot utilization at time t ($\eta(t)$) may be determined as follows (S201 of FIG. 2):

When $t \leq T_{Avg}$, $$\eta(t) = \frac{\text{number of slots used during } [1, t]}{\text{number of slots assigned during } [1, t]} = \sum_{k=1}^{t} A_k \Big/ \sum_{k=1}^{t} U_k \quad (1)$$

When $t > T_{Avg}$, $$\eta(t) = \frac{\text{number of slots used during } [t - T_{Avg} + 1, t]}{\text{number of slots assigned during } [t - T_{Avg} + 1, t]} \quad (2)$$

$$= \sum_{k=t-T_{Avg}+1}^{t} A_k \Big/ \sum_{k=t-T_{Avg}+1}^{t} U_k$$

In above equations (1) and (2), $A_k$ is the number of slots allocated for frame k (by Periodic Allocation), and $U_k$ is the number of slots in frame k being used.

For example, the periodically allocated slots may be put together with other assignments (e.g., on a backlog basis—where a terminal is exhibiting a high backlog, additional bandwidth may be allocated to that terminal to alleviate such backlog). When the expected burst arrives at the IGM, the used number of slots in carrying data could be higher. For consistency, set $U_k=A_k$ if the burst has the desired data type (e.g., Interactive), otherwise $U_k=0$ if the burst has no such data type. One way to determine whether the burst has the desired type is to look at the amount of bytes for a certain priority type. For example, if the amount of bytes for priority 1 is non-zero, then $U_k=A_k$ for frame k; otherwise, $U_k=0$. Note from the above equations, $\eta(t)$ is obtained based on a sliding window $T_{Avg}$. The initial value is set to zero.

(2) Volume Utilization

Pursuant to the volume utilization approach, a received burst at the IGM contains the volume of data (in bytes) for each data traffic priority level, which may serve as a basis for deriving a measurement of volume utilization. Accordingly, because the utilized volume indicated in by burst represents all the slots allocated in this frame by periodic allocation, backlog based allocation and other allocations, a count of all the relevant slots may be used in calculating the volume utilization.

By way of example, where t denotes time (e.g., specified as a frame point) and $T_{Avg}$ denotes the averaging period (e.g., specified as a number of frames), the average volume utilization at time t ($\eta(t)$) may be determined as follows (S211 of FIG. 2):

When $t \leq T_{Avg}$, $$\eta(t) = \frac{\text{average volume (bytes) received during } [1, t]}{\text{bandwidth (bytes) assigned during } [1, t]} \quad (3)$$

$$= \sum_{k=1}^{t} V_{recv,k} \Big/ \sum_{k=1}^{t} V_{alloc,k}$$

When $t > T_{Avg}$, $$\eta(t) = \frac{\text{average volume (bytes) received during } [t - T_{Avg} + 1, t]}{\text{bandwidth (bytes) assigned during } [t - T_{Avg} + 1, t]} \quad (4)$$

$$= \sum_{k=t-T_{Avg}+1}^{t} V_{recv,k} \Big/ \sum_{k=t-T_{Avg}+1}^{t} V_{alloc,k}$$

In above equations (3) and (4), $V_{alloc,k}$ is the allocated bandwidth in frame k for the desired traffic type (where, for example, latency sensitive traffic may be classified as Interactive) in bytes (converted from slots based on the code rate), and $V_{recv,k}$ is the received volume in bytes (including overhead) for this traffic type in the burst at frame k. Further, in addition to Periodic bandwidth allocations, $V_{alloc,k}$ may include other allocations, such as backlog-based and other bandwidth allocations. Additionally, $V_{recv,k}$ may further account for overhead, e.g., $$V_{recv,k} = \frac{\text{True received volume (bytes) in frame } k}{1 - \text{average overhead percentage}} \quad (5)$$

C. Rate Adaptation

In accordance with the present embodiment, rate adaptation for the terminal refers to the process whereby the IGM adaptively allocates bandwidth to a terminal based on the terminal bandwidth utilization, whereby the allocations may be modified on a periodic basis to address changes in terminal bandwidth utilization over time. As discussed above, the adaptive bandwidth allocation approach of the present embodiment applies bandwidth allocation on the basis of two ranges of rates for bandwidth allocation—(1) Range A (a range of relatively lower rates), which is based on a table of applicable rate steps for bandwidth allocation within the overall range of rates (see, e.g., Table 1), and exhibits smaller and pre-defined step sizes; and (2) Range B (a range of relatively higher rates, above the highest rate of the Range A), which is based on a configurable and potentially larger step size.

(1) Inner Loop in Range A

Pursuant to this embodiment, an algorithm for adaptive periodic rates for bandwidth allocation, with respect to rates within the lower Range A, on a per terminal basis (the Inner Loop Rate Adaptation for Range A) is provided as follows. In this algorithm, $\eta_{tar}$ reflects the target utilization for a terminal, and $\theta$ reflects a respective tolerance range. The current index number from the table of bandwidth allocation rates is denoted as i, where $1 \leq i \leq I_{max}$, and $I_{max} \leq \max(\text{item set})$, where $I_{max}$ is the index of the maximum periodic rate for a terminal (where this maximum periodic rate, at any given time, may be a lower rate than the maximum rate of the allocation rate table—this may be due to the fact that the outer loop has restricted the maximum rate permitted for any terminal within the inroute group (e.g., based on overall bandwidth availability). In Table 1, the max (item set)=12. The maximum and minimum index of the item set is denoted as $I_{upper}$ and $I_{lower}$. So in Table 1, $I_{upper}=12$ and $I_{lower}=1$. Basically, $I_{upper}$ represents the size of the table and is the upper limit of $I_{max}$. A configurable update period is defined, which is denoted as $T_{update}$. By way of example, the default value for $T_{update}$ may be set at 12 frames. The rate adaptation algorithm may be expressed as follows (S203 of FIG. 2), where $\eta(t)$ represents the slot or volume utilization (determined as provided above for terminal k at the time or frame point t), and $I_k(t)$ represents the new index (to be applied for the terminal k until expiration of the next update period). When t is a multiple of $T_{update}$ (when t is at a point where the $T_{update}$ period has passed), i.e., $\text{Mod}(t, T_{update})=0$, if $\eta(t) > \eta_{tar} + \theta_{upper}$, then $I_k(t) = \min(i+1, I_{max})$; (6)

if $\eta(t) < \eta_{tar} - \theta_{lower}$, then $I_k(t) = \max(i-1, 1)$; (7)

if $\eta_{tar} - \theta_{lower} \leq \eta(t) \leq \eta_{tar} + \theta_{upper}$, then $I_k(t)$ is not changed. (8)

In other words, for equation (6), when the current utilization is higher than the target utilization plus the upper tolerance (the terminal is utilizing more bandwidth than the target allocation/tolerance), the rate for allocations to the terminal should be increased to bring it within the range of the target utilization plus the tolerance (S209/S219 of FIG. 2). In that case, the index is increased within the table by one step, but not higher than the maximum allowable index. Similarly, for equation (7), when the current utilization is lower than the target utilization minus the lower tolerance (the terminal is utilizing less bandwidth than the target allocation/tolerance), the rate for allocations to the terminal should be decreased to bring it within the range of the target utilization minus the tolerance (S209/S219 of FIG. 2). In that case, the index is decreased by one step, but not lower than the index 1. According to equation (8), when the current utilization is within the range of the target plus/minus the upper tolerance/lower tolerance, the rate for allocations to the terminal should remain unchanged (S209/S219 of FIG. 2).

By way of example, the default value for the targeted utilization may be set as $\eta_{tar}=90\%$ (0.90), and the default values for the upper and lower tolerance range may be set as $\theta_{upper}=\theta_{lower}=5\%$ (0.05) (note that $\theta_{lower}$ and $\theta_{upper}$ can have different values). The initial rate of $I_k(t)$ can be set as 20 kbps (in Table 1, for t=1, $I_k(1)=9$). By way of further example, $I_{max}$ can be configured smaller that max(item set) so that when a large number of terminals show up, the max inroute rate becomes smaller, accommodating more users. The determination of $I_{max}$ is discussed below, for example, with respect to the outer loop bandwidth allocation adaptation process.

(2) Inner Loop in Range B

Pursuant to this embodiment, an algorithm for adaptive periodic rates for bandwidth allocation, with respect to rates within the upper Range B, on a per terminal basis (the Inner Loop Rate Adaptation for Range B) is provided as follows. In Range B, by applying a relative step size, the rate can be adjusted by increasing or decreasing the relative step size, obtaining a new rate, in the format of an integer number of slots per frame. The rate adaptation algorithm may be expressed as follows (S213 of FIG. 2). For this algorithm: $N_{slot,upper}$ and $N_{slot,lower}$ (in slots per frame) are defined as the configurable upper and lower limits for the rate of allocations within Range B, and $N_{slot,max}$ is the maximum number of slots per frame that can be assigned to a terminal, where $N_{slot,lower} \leq N_{slot,max} \leq N_{slot,upper}$. By way of example, $N_{slot,max}$ may be determined at run-time by the outer loop process (discussed below). Further, $\Delta_{inner}$ denotes the relative step size of the inner loop, $N_{slot}(k)$ denotes the adapted number of slots per frame to be set at updating period k, and $T_{update}$ again reflects the configurable update period. When t is a multiple of $T_{update}$ (when t is at a point where the $T_{update}$ period has passed), i.e., $Mod(t, T_{update})=0$, and $N_{slot,lower} < N_{slot}(k) \leq N_{slot,max}(k)$, if $\eta(t) > \eta_{tar} + \theta_{upper}$, then $N_{slot}(k) = \min\{round\_up[(1+\Delta_{inner}) \cdot N_{slot}(k-1)], N_{slot,max}(k)\}$; (9)

if $\eta(t) < \eta_{tar} - \theta_{lower}$, then $N_{slot}(k) = \max\{round\_down[(1-\Delta_{inner}) \cdot N_{slot}(k-1)], N_{slot,lower}\}$; (10)

if $\eta_{tar} - \theta_{lower} \leq \eta(t) \leq \eta_{tar} + \theta_{upper}$, then $N_{slot}(k) = N_{slot}(k-1)$. (11)

In other words, for equation (9), when the current utilization is higher than the target utilization plus the upper tolerance (the terminal is utilizing more bandwidth than the target allocation/tolerance), the rate for allocations to the terminal should be increased to bring it within the range of the target utilization plus the tolerance. In that case, the rate of allocated slots per frame is increased by the relative step size, but not higher than the maximum allowable slots per frame. Similarly, for equation (10), when the current utilization is lower than the target utilization minus the lower tolerance (the terminal is utilizing less bandwidth than the target allocation/tolerance), the rate for allocations to the terminal should be decreased to bring it within the range of the target utilization minus the tolerance. In that case, the rate of allocated slots per frame is decreased by the relative step size, but not lower than the minimum allowable slots per frame. According to equation (11), when the current utilization is within the range of the target plus/minus the upper tolerance/lower tolerance, the rate for allocations to the terminal should remain unchanged.

By way of example, the value of $N_{slot,lower}$ is set as the maximum rate in the adaptation table (Table 1) so that the transition between the table based and step based adaptations are seamlessly smooth. If needed, the utilization target, tolerance range, and the step size can be defined at the terminal basis, which may be determined by the service and terminal types. As will be appreciated, generally, if the utilization target is low and the upward step size is large, then the delay performance can be better.

By way of further example, for a consumer-level terminal (as opposed to a business level terminal) running HTTP or HTTPS, the traffic is delay and jitter tolerant, thus the utilization target can be set higher. For a business-level terminal running delay sensitive traffic, such as terrestrial backhaul for VOIPs or interactive video streaming, the utilization target and step size should be appropriately set to meet the delay and jitter target. The relationship between the latency, utilization and step size can be further explored by considering traffic characteristics and loop delays. Further, for business terminals subject to a group limit (for example, a terminal group with a plural of terminals subscribing a maximum rate), the maximum allowed rate per terminal may be controlled such that the throughput of the whole terminal group is bounded. We can add a scaling factor to address this requirement.

In accordance with further embodiments, because the parameters of utilization, tolerance range and step size are configurable, three sets of the same parameters can be defined to accommodate different needs, given as delay-sensitive, non-delay-sensitive and general types. A terminal may be assigned one set at run-time subject to the terminal type and QoS requirements. Further, to support the convergent services (including consumer and enterprises), the above rate control algorithm can thus be as follows: $\eta_{tar}$, $\theta_{upper}$, $\theta_{lower}$ may denote the utilization and upper and lower tolerances, and $\Delta_{inner,down}$ denote the relative upward and downward step sizes of the inner loop. A three-tuple parameter set $(\eta_{tar}, \Delta_{inner,up}, \Delta_{inner,down})$ is configured, which can fit delay-sensitive, non-delay-sensitive and general terminal QoS requirements. The three sets of parameters can be pre-configured based on evaluating the performance of latency and throughput. Further, $N_{slot}(k)$ is the number of slots per frame at updating period k, and F(t) is the scaling factor applicable at per terminal basis at time t. When time t (in frames) is a multiple of $T_{update}$, i.e., $Mod(t, T_{update})=0$, and $N_{slot,lower} < N_{slot}(k) \leq N_{slot,max}(k)$, if $\eta(t) > \eta_{tar} + \theta_{upper}$, then $N_{slot}(k) = \min\{round\_up[(1+\Delta_{inner}) \cdot N_{slot}(k-1)], F(t) \cdot N_{slot,max}(k)\}$; (12)

if $\eta(t) < \eta_{tar} - \theta_{lower}$, then $N_{slot}(k) = \max\{round\_down[(1-\Delta_{inner}) \cdot N_{slot}(k-1)], N_{slot,lower}\}$;

if $\eta_{tar} - \theta_{lower} \leq \eta(t) \leq \eta_{tar} + \theta_{upper}$, then $N_{slot}(k) = N_{slot}(k-1)$. (14)

By way of example, the value of $N_{slot,lower}$ is set as the maximum rate in the adaptation table (Table 1) so that the transition between the table based and step based adaptations are seamlessly smooth. By way of further example, F can be either time varying or configurable—where, if F is configurable, then the default value may be F=1.

(3) Transition Between Ranges A and B

To assure the smooth transition between ranges A and B, the lowest rate in Range A should be set the same as the highest rate in Range B, i.e., $N_{slot,lower}$=Rate of ($I_{upper}$), where the Rate of ($I_{upper}$) in Table 1 must be an integer. When $N_{slot,lower}$ in range B or $I_{upper}$ in range A is reached (S205/S207/S215/S217 of FIG. 2): (1) if the direction is up, then Adaptation Scheme B is used; (2) if the direction is down, then Adaptation Scheme A is used; (3) otherwise, the assigned rate is unchanged. According to further embodiments, either of the Ranges A or B may be disabled. For example, to disable adaptation Range B, $N_{slot,upper}=N_{slot,lower}$=Rate of ($I_{upper}$) can be set in the configuration, and to disable adaptation Range A, all items in Table 1 can be set the same as $N_{slot,lower}$. Accordingly, by configuring the items in Table 1, and $N_{slot,lower}$ and $N_{slot,upper}$, the inroute rate can be adaptively adjusted over a wide range.

II. Outer Loop Rate Control

Figure 3:
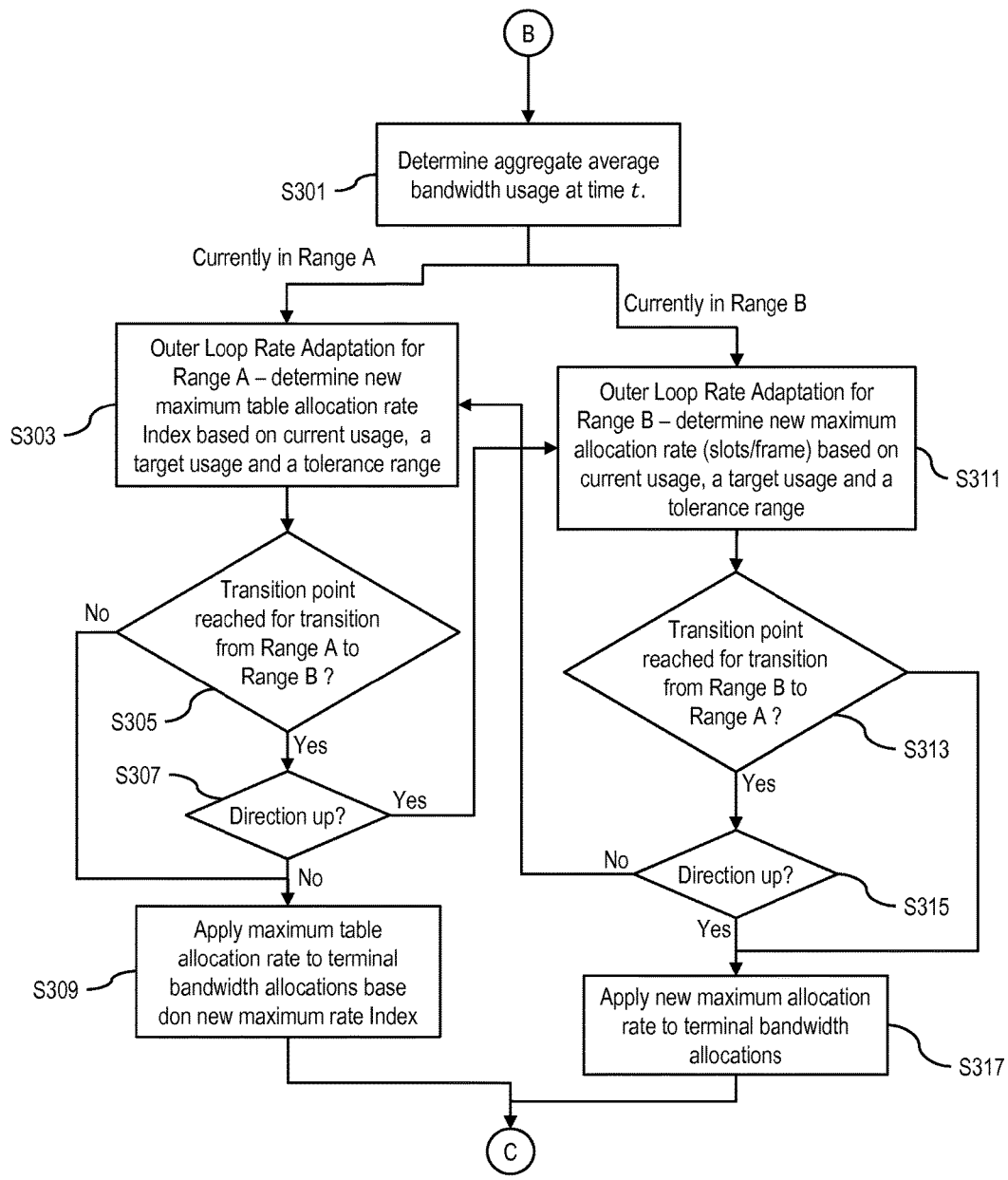
FIG. 3 illustrates a flow chart depicting an Outer Loop algorithm for periodic adaptation of rates for bandwidth allocations (on a per inroute or Inroute Group basis), in accordance with example embodiments of the present invention.

FIG. 3 illustrates a flow chart depicting an Outer Loop algorithm for periodic adaptation of rates for bandwidth allocations (on a per inroute or Inroute Group basis), in accordance with example embodiments of the present invention. In further accordance with such example embodiments, pursuant to the outer loop rate control mechanism, a maximum rate applicable to all terminals in an inroute or Inroute Group for Periodic Allocation is determined. The IGM maintains the overall bandwidth usage of periodic compared to the total available inroute resources based on a predefined target. According to example embodiments, the following approach for the outer loop adaptive rate control for bandwidth allocation is applicable on either a per inroute basis a per Inroute Group basis.

By way of example, when the network is congested, the bandwidth assigned to the periodic allocation should be limited such that some large bulk bursts can be transmitted at faster speed via on-demand allocation. This can be achieved also through a control mechanism that attempts to meet a target that is predefined for the portion of periodic allocation usage. The portion of periodic usage is defined as the ratio of total slots in a period assigned for periodic and the total available slots (on the whole inroute) in this period. If the overall portion of periodic allocation is higher than the predefined target, the upper limit of the adaptive rate is lowered until the lower bound is reached; otherwise, it is increased until the upper bound is reached. If the portion of usage is within the tolerance range of the target, the upper limit keeps intact.

Pursuant to this embodiment, an algorithm for adaptive bandwidth allocation, with respect to rates on a per inroute or Inroute Group basis (the Outer Loop Rate Adaptation) is provided as follows. According to this algorithm, $U_{periodic}(t)$ denotes the usage or utilized portion of periodic allocation over all available bandwidth (inroute slots per frame over the inroute or Inroute Group), excluding assignments for CBR (VOIP) at time t (specified in frames). Further, $T_{PAVG}$ denotes the averaging period (in frames) for the usage portion of the periodic allocation, and $T_{PAVG}(t)$ denotes the average usage over the averaging period $T_{PAVG}$, calculated at time t (frames). By way of example, the default value for $T_{PAVG}$ can also be set as 40 frames. In this context, the average usage/utilization at time t, $U_{PAVG}(t)$, is determined as follows (S301 of FIG. 3):

$$\text{if } t < T_{PAVG}, \text{ then } U_{PAVG}(t) = \sum_{k=1}^{t} U_{periodic}(k)/t; \quad (15)$$

$$\text{if } t \geq T_{PAVG}, \text{ then } U_{PAVG}(t) = \sum_{k=t-T_{PAVG}+1}^{t} U_{periodic}(k)/T_{PAVG}; \quad (16)$$

Accordingly, the Outer Loop rate control mechanism is provided to achieve this target. According to this embodiment, again the adaptation is applied over the Ranges A and B. In this regard, for the Range A, an upper rate limit is determined for application as the maximum rate that can be applied on a per terminal basis pursuant to the allocation rate table for the Range A (e.g., Table 1), as represented by the table index. Further, for the Range B, an upper rate limit is determined for application as the maximum rate (in number of slots per frame) that can be assigned to a particular terminal, pursuant to a Range B allocation. The objective of the outer loop is to adjust the upper rate limit, whether in Range A or Range B, based on the overall slot usage on the inroute or Inroute Group.

A. Outer Loop in Range A

For the Range A outer loop algorithm of the present embodiment, $U_{tar}$ denotes the periodic allocation target for the inroute or Inroute Group, and $\delta_{Blower}$ and $\delta_{upper}$ respectively reflect the lower and upper tolerances for the target allocation/utilization. Also, as discussed above, $U_{PAVG}(t)$ reflects the average usage/utilization at time t. Further, $I_{max}$ (again) denotes the index of maximum periodic rate (e.g., which is limited by the maximum rate in the index table, i.e., $I_{max} \leq \max(\text{item in the index table})$). $I_{max}$ is updated based on the overall periodic usage. Also, as with the per terminal inner loop process, $T_{p\_update}$ denotes the update period for the rate limit for periodic allocation. Similarly, the default value can be $T_{p\_update}=12$ frames. In this context, the Range A outer loop algorithm is provided as follows (S303 of FIG. 3). When time t (in frames) is a multiple of $T_{p\_update}$, i.e., $\text{Mod}(t, T_{p\_update})=0$, $$\text{if } U_{PAVG}(t) > U_{tar} + \delta_{upper}, \text{ then } I_{max}(t) = \max[I_{lower}, I_{max}(t-1)-1]; \quad (17)$$

$$\text{if } U_{PAVG}(t) < U_{tar} - \delta_{lower}, \text{ then } I_{max}(t) = \min[I_{upper}, I_{max}(t-1)+1]; \quad (18)$$

$$\text{if } U_{tar} - \delta_{lower} \leq U_{PAVG}(t) \leq U_{tar} + S\delta_{upper}, \text{ then } I_{max}(t) = I_{max}(t-1). \quad (19)$$

In other words, for equation (17), when the current allocation is higher than the target allocation plus the upper tolerance (the current allocation is higher than the target allocation/tolerance), the maximum rate for allocations per terminal should be reduced to bring the total allocation within the range of the target allocation plus the tolerance (S309/S317 of FIG. 3). In that case, the maximum rate for allocations per terminal (reflected by the table index) is decreased one step from the previous maximum, but not lower than the minimum index of the table. Similarly, for equation (18), when the current allocation is lower than the target allocation minus the lower tolerance (the current allocation is lower than the target allocation/tolerance), the maximum rate for allocations per terminal should be increased to bring the total allocation within the range of the target allocation minus the tolerance (S309/S317 of FIG. 3). In that case, the maximum rate for allocations per terminal (reflected by the table index) is increased one step from the previous maximum, but not higher than the maximum index of the table. According to equation (19), when the current allocation is within the range of the target plus/minus the upper tolerance/lower tolerance, the maximum rate for allocations per terminal should remain unchanged (S309/S317 of FIG. 3).

By way of example, the index $I_{max}(t)$ keeps intact during the interval between two update times. The default value for the targeted utilization is configurable and can be set, for example, as $U_{tar}=55\%$ (0.55). By way of further example, the default values for upper and lower tolerance may be set as $\delta_{lower}=\delta_{upper}=5\%$ (0.05) (note they can have different values). Further, the initial value of $I_{max}$ may be set as being equal to $I_{upper}$.

B. Outer Loop in Range B

For the Range B outer loop algorithm of the present embodiment, $N_{slot,upper}$ and $N_{slot,lower}$ reflect configurable upper and lower rate limits. Further, $\Delta_{outer}$ reflects a configurable relative step size. In this context, the Range B outer loop algorithm is provided as follows (S311 of FIG. 3). Also, again, $U_{PAVG}(t)$ reflects the average usage/utilization at time t. When time t (in frames) is a multiple of $T_{p\_update}$, i.e., $\text{Mod}(t, T_{p\_update})=0$, (t is in period k), $$\text{if } U_{PAVG}(t) > U_{tar} + \delta_{upper}, \text{ then } N_{slot,max}(k) = \max\{N_{slot,lower}, \text{round\_down}[N_{slot,max}(k-1) \cdot (1-\Delta_{outer})]\}; \quad (20)$$

$$\text{if } U_{PAVG}(t) < U_{tar} - \delta_{lower}, \text{ then } N_{slot,max}(k) = \min\{N_{slot,upper}, \text{round\_up}[N_{slot,max}(k-1) \cdot (1+\Delta_{outer})]\}; \quad (21)$$

$$\text{if } U_{tar} - \delta_{lower} \leq U_{PAVG}(t) \leq U_{tar} + \delta_{upper}, \text{ then } N_{slot,max}(k) = N_{slot,max}(k-1). \quad (22)$$

Further, for the Range B outer loop control algorithm, the control parameters may be the same as for the range A algorithm.

C. Transition Between Ranges A and B

As with the Inner Loop control algorithm of the present embodiment, for assuring smooth transition between the Ranges A and B of the outer loop, $N_{slot,lower}$ should be set equal to the Rate of ($I_{upper}$). When $N_{slot,lower}$ in range B or $I_{upper}$ in range A is reached (S305/S313 of FIG. 3): (1) if the direction is up, then the outer loop algorithm for Range B is used (S307/S315 of FIG. 3); (2) if the direction is down, then the outer loop algorithm for Range A is used (S307/S315 of FIG. 3); (3) otherwise, the required maximum rate remains unchanged (S307/S315 of FIG. 3). Further, similar to the inner loop control, to disable the outer loop for the Range B, $N_{slot,lower}=N_{slot,upper}=$Rate of ($I_{upper}$) can be set in the configuration, and to disable the outer loop for the Range A, all items in Table 1 can be set the same as $N_{slot,lower}$. Accordingly, the same parameter settings to disable the inner loop would work the same way for the outer loop.

Figure 4:
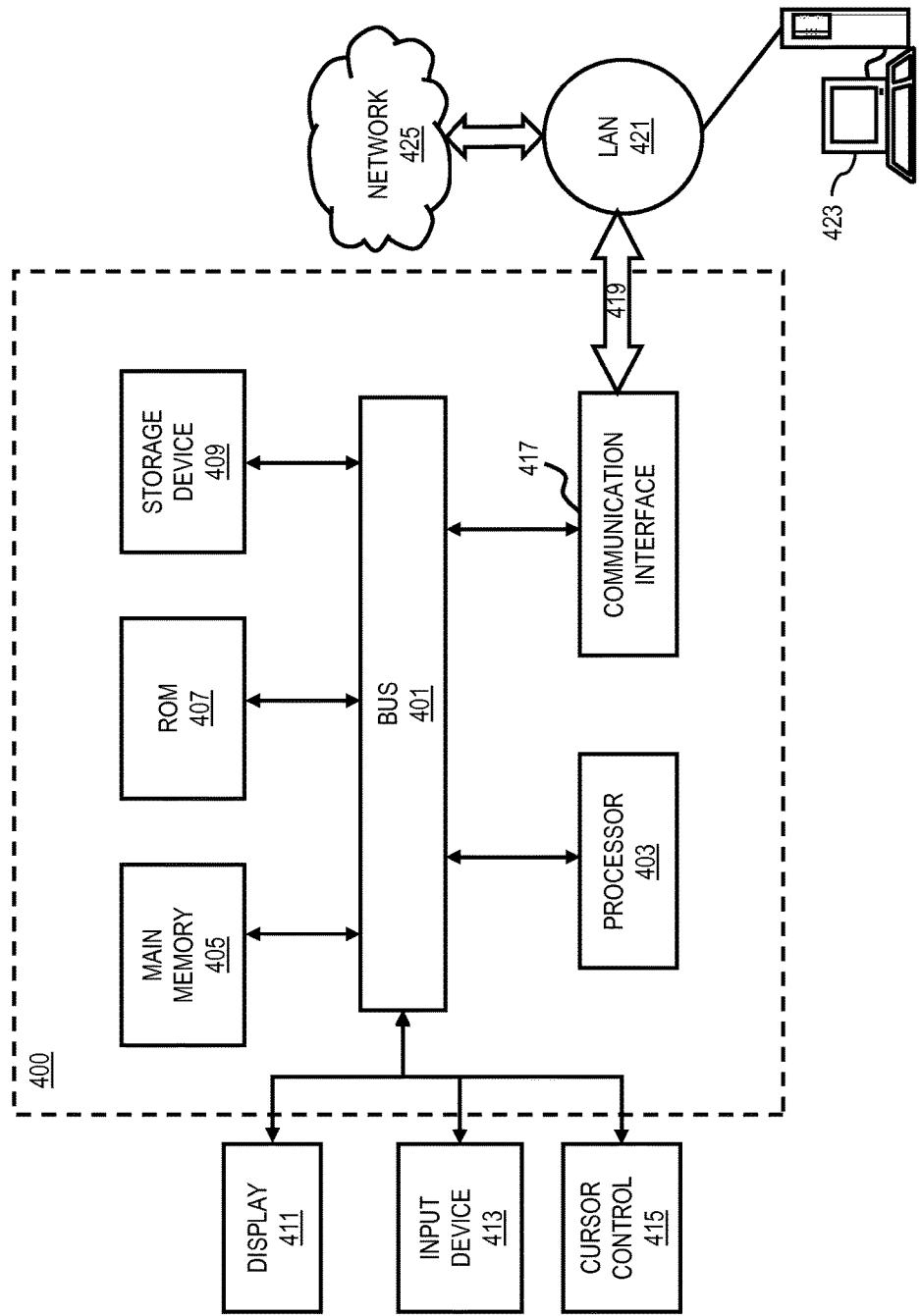
FIG. 4 illustrates a computer system upon which example embodiments according to the present invention can be implemented.

FIG. 4 illustrates a computer system upon which example embodiments according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

The computer system 400 is coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is cursor control 415, such as a mouse, a trackball, or cursor direction keys for communicating direction information and command selections to the processor 403 and for controlling cursor movement on the display 411.

According to one embodiment of the invention, dynamic and flexible architectures and methods for association of remote nodes with respective aggregation nodes, in accordance with example embodiments, are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry is used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417, for example, includes peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 provides a connection through local network 421 to a host computer 423, which has connectivity to a network 425 (e.g. a wide area network (WAN) or the global packet data communication network now commonly referred to as the "Internet") or to data equipment operated by service provider. The local network 421 and network 425 both use electrical, electromagnetic, or optical signals to convey information and instructions. The signals through the various networks and the signals on network link 419 and through communication interface 417, which communicate digital data with computer system 400, are example forms of carrier waves bearing the information and instructions.

The computer system 400 sends messages and receives data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 executes the transmitted code while being received and/or store the code in storage device 239, or other non-volatile storage for later execution. In this manner, computer system 400 obtains application code in the form of a carrier wave.

The term "computer-readable medium" as used herein refers to any medium that participates in providing instructions to the processor 403 for execution. Such a medium may take many forms, including but not limited to non-volatile media, and volatile media. Non-volatile media include, for example, optical or magnetic disks, such as storage device 409. Volatile media may include dynamic memory, such as main memory 405. Common forms of computer-readable media include, for example, a floppy disk, a flexible disk, hard disk, magnetic tape, any other magnetic medium, a CD ROM, CDRW, DVD, any other optical medium, RAM, PROM, and EPROM, FLASH EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining an average utilization of periodic bandwidth, at a given point in time, of a plurality of remote terminals for data transmissions over a channel of a wireless data communications system, wherein the average utilization of the periodic bandwidth is determined based on a first averaging period, and the periodic bandwidth is a portion of overall bandwidth of the channel allocated for periodic bandwidth allocations to each terminal of the plurality of remote terminals for data transmissions of the respective terminal over the channel;
   determining a maximum level for the periodic bandwidth allocations to each terminal of the plurality of remote terminals based on the determined average utilization of periodic bandwidth of the plurality of remote terminals at the given point in time and a target level for the periodic bandwidth;
   determining a utilization metric that reflects a utilization level of the periodic bandwidth, at the given point in time, by a one terminal of the plurality of remote terminals based on a second averaging period, where the second averaging period may be equal to the first averaging period;
   determining an updated utilization level for the periodic bandwidth allocations to the one terminal of the plurality of remote terminals based on the determined utilization metric for the one terminal and a target level for utilization of the periodic bandwidth by the one terminal, wherein the updated utilization level for the periodic bandwidth allocations to the one terminal is determined so as not to exceed the determined maximum level for the periodic bandwidth allocations to each terminal of the plurality of remote terminals; and
   applying the updated utilization level for the periodic bandwidth allocations to the one terminal for one or more subsequent data transmissions of the one terminal over the channel.

2. The method according to claim 1, wherein:
   in an event that the determined utilization metric reflects that the utilization level of the periodic bandwidth utilized by the one terminal is higher than the target level for the utilization of the periodic bandwidth by the one terminal, the determined updated utilization level for the periodic bandwidth allocations to the one terminal is increased; and
   in an event that the determined utilization metric reflects that the utilization level of the periodic bandwidth utilized by the one terminal is lower than the target level for the utilization of the periodic bandwidth by the one terminal, the determined updated utilization level for the periodic bandwidth allocations to the one terminal is decreased.

3. The method according to claim 2, wherein, in the event that the determined utilization metric reflects that the utilization level of the periodic bandwidth utilized by the one terminal is higher than the target level for the utilization of the periodic bandwidth by the one terminal, the increase in the determined updated utilization level for the periodic bandwidth allocations to the one terminal is performed on a step by step basis up to the maximum level for the periodic bandwidth allocations to each terminal of the plurality of remote terminals.

4. The method according to claim 2, wherein, in the event that the determined utilization metric reflects that the utilization level of the periodic bandwidth utilized by the one terminal is lower than the target level for the utilization of the periodic bandwidth by the one terminal, the decrease in the determined updated utilization level for the periodic bandwidth allocations to the one terminal is performed on a step by step basis.

5. The method according to claim 1, wherein the determination of the utilization metric of the one terminal comprises monitoring slot utilization of the one terminal and determining one of an average slot utilization and a volume utilization over the second averaging period.

6. The method according to claim 1, wherein the target level for the periodic bandwidth reflects a predetermined portion of the overall bandwidth of the channel allocated for the periodic bandwidth allocations to the plurality of remote terminals.

7. The method according to claim 6, wherein:
   in an event that the determined average utilization of the periodic bandwidth of the plurality of remote terminals over the first averaging period is higher than the target level for the periodic bandwidth, the maximum level for the periodic bandwidth allocations to each terminal of the plurality of remote terminals is decreased; and
   in an event that the determined average utilization of the periodic bandwidth of the plurality of remote terminals over the first averaging period is lower than the target level for the periodic bandwidth, the maximum level for the periodic bandwidth allocations to each terminal of the plurality of remote terminals is increased.

8. The method according to claim 6, wherein the target level for the periodic bandwidth is subject to a tolerance range defined by a lower tolerance and an upper tolerance, and wherein:
in an event that the determined average utilization of the periodic bandwidth of the plurality of remote terminals over the first averaging period is higher than the target level for the periodic bandwidth plus the upper tolerance, the maximum level for the periodic bandwidth allocations to each terminal of the plurality of remote terminals is decreased;
in an event that the determined average utilization of the periodic bandwidth of the plurality of remote terminals over the first averaging period is lower than the target level for the periodic bandwidth minus the lower tolerance, the maximum level for the periodic bandwidth allocations to each terminal of the plurality of remote terminals is increased; and
in an event that the average determined utilization of the periodic bandwidth of the plurality of remote terminals over the first averaging period is within a range from the target level for the periodic bandwidth minus the lower tolerance to the target level for the periodic bandwidth plus the upper tolerance, the maximum level for the periodic bandwidth allocations to each terminal of the plurality of remote terminals is maintained.

9. An apparatus comprising:
a receiver configured to receive data transmissions from a plurality of remote terminals via an uplink inroute channel group of a wireless data communications system; and
a processor configured to determine an average utilization of periodic bandwidth, at a given point in time, of the plurality of remote terminals, wherein the average utilization of the periodic bandwidth is determined based on a first averaging period, and the periodic bandwidth is a portion of overall bandwidth of the channel allocated for periodic bandwidth allocations to each terminal of the plurality of remote terminals for data transmissions of the respective terminal over the channel; and
wherein the processor is further configured to determine a maximum level for the periodic bandwidth allocations to each terminal of the plurality of remote terminals at the given point in time based on the determined average utilization of periodic bandwidth of the plurality of remote terminals and a target level for the periodic bandwidth,
wherein the processor is further configured to determine a utilization metric that reflects a utilization level of the periodic bandwidth, at the given point in time, by a one terminal of the plurality of remote terminals based on a second averaging period, where the second averaging period may be equal to the first averaging period,
wherein the processor is further configured to determine an updated utilization level for the periodic bandwidth allocations to the one terminal of the plurality of remote terminals based on the determined utilization metric for the one terminal and a target level for utilization of the periodic bandwidth by the one terminal, wherein the updated utilization level for the periodic bandwidth allocations to the one terminal is determined so as not to exceed the determined maximum level for the periodic bandwidth allocations to each terminal of the plurality of remote terminals, and
wherein the apparatus is configured to apply the updated utilization level for the periodic bandwidth allocations to the one terminal for one or more subsequent data transmissions of the one terminal over the channel.

10. The apparatus according to claim 9, wherein:
in an event that the determined utilization metric reflects that the utilization level of the periodic bandwidth utilized by the one terminal is higher than the target level for the utilization of the periodic bandwidth by the one terminal, the processor is configured to increase the determined updated utilization level for the periodic bandwidth allocations to the one terminal; and
in an event that the determined utilization metric reflects that the utilization level of the periodic bandwidth utilized by the one terminal is lower than the target level for the utilization of the periodic bandwidth by the one terminal, the processor is configured to decrease the determined updated utilization level for the periodic bandwidth allocations to the one terminal.

11. The apparatus according to claim 10, wherein, in the event that the determined utilization metric reflects that the utilization level of the periodic bandwidth utilized by the one terminal is higher than the target level for the utilization of the periodic bandwidth by the one terminal, the increase in the determined updated utilization level for the periodic bandwidth allocations to the one terminal is performed on a step by step basis up to the maximum level for the periodic bandwidth allocations to each terminal of the plurality of remote terminals.

12. The method according to claim 10, wherein, in the event that the determined utilization metric reflects that the utilization level of the periodic bandwidth utilized by the one terminal is lower than the target level for the utilization of the periodic bandwidth by the one terminal, the decrease in the determined updated utilization level for the periodic bandwidth allocations to the one terminal is performed on a step by step basis.

13. The apparatus according to claim 9, wherein the determination of the utilization metric of the one terminal comprises monitoring slot utilization of the one terminal and determining one of an average slot utilization and a volume utilization over the second averaging period.

14. The apparatus according to claim 9, wherein the target level for the periodic bandwidth reflects a predetermined portion of the overall bandwidth of the channel allocated for the periodic bandwidth allocations to the plurality of remote terminals.

15. The apparatus according to claim 14, wherein:
in an event that the determined average utilization of the periodic bandwidth of the plurality of remote terminals over the first averaging period is higher than the target level for the periodic bandwidth, the processor is configured to decrease the maximum level for the periodic bandwidth allocations to each terminal of the plurality of remote terminals; and
in an event that the determined average utilization of the periodic bandwidth of the plurality of remote terminals over the first averaging period is lower than the target level for the periodic bandwidth, the processor is configured to increase the maximum level for the periodic bandwidth allocations to each terminal of the plurality of remote terminals.

16. The apparatus according to claim 14, wherein the target level for the periodic bandwidth is subject to a tolerance range defined by a lower tolerance and an upper tolerance, and wherein:
in an event that the determined average utilization of the periodic bandwidth of the plurality of remote terminals over the first averaging period is higher than the target level for the periodic bandwidth plus the upper tolerance, the processor is configured to decrease the maximum level for the periodic bandwidth allocations to each terminal of the plurality of remote terminals;

in an event that the determined average utilization of the periodic bandwidth of the plurality of remote terminals over the first averaging period is lower than the target level for the periodic bandwidth minus the lower tolerance, the processor is configured to increase the maximum level for the periodic bandwidth allocations to each terminal of the plurality of remote terminals; and in an event that the average utilization of the periodic bandwidth of the plurality of remote terminals over the first averaging period is within a range from the target level for the periodic bandwidth minus the lower tolerance to the target level for the periodic bandwidth plus the upper tolerance, the processor is configured to maintain the maximum level for the periodic bandwidth allocations to each terminal of the plurality of remote terminals.

* * * * *